(12) United States Patent
Forissier et al.

(10) Patent No.: US 7,860,095 B2
(45) Date of Patent: Dec. 28, 2010

(54) METHOD AND APPARATUS FOR LOAD-BALANCING

(75) Inventors: Jerome Forissier, Juan les Pins (FR); Richard Gayraud, Antibes (FR); Marc Lamberton, Antibes (FR); David Mansutti, Valbonne (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/577,844

(22) PCT Filed: Jul. 12, 2004

(86) PCT No.: PCT/EP2004/051462

§ 371 (c)(1),
(2), (4) Date: Jan. 19, 2007

(87) PCT Pub. No.: WO2005/050946

PCT Pub. Date: Jun. 2, 2005

(65) Prior Publication Data

US 2007/0147339 A1  Jun. 28, 2007

(30) Foreign Application Priority Data

Oct. 30, 2003 (EP) .................................. 03292711

(51) Int. Cl.
*H04L 12/56* (2006.01)
(52) U.S. Cl. .................... 370/392; 370/389; 370/390; 370/385; 709/222; 709/229
(58) Field of Classification Search ................. 709/245, 709/229; 370/230, 399
See application file for complete search history.

(56) References Cited

U.S. PATENT DOCUMENTS

| 5,924,097 | A  |   | 7/1999  | Hill et al. |
|-----------|----|---|---------|-------------|
| 6,092,178 | A  | * | 7/2000  | Jindal et al. .................... 712/27 |
| 6,195,682 | B1 |   | 2/2001  | Ho et al. ...................... 709/203 |
| 6,473,802 | B2 | * | 10/2002 | Masters ....................... 709/229 |
| 6,779,017 | B1 | * | 8/2004  | Lamberton et al. .......... 709/203 |

(Continued)

FOREIGN PATENT DOCUMENTS

WO   99/18534   4/1999

OTHER PUBLICATIONS

Non-Final Office Action dated Apr. 6, 2009 cited by examiner in U.S. Appl. No. 10/557,405, 16 pgs.

(Continued)

*Primary Examiner*—Huy D Vu
*Assistant Examiner*—Zewdu Beyen

(57) ABSTRACT

According to one aspect of the present invention, there is provided a method of outing a message, conveyed in stream through a point-to-point connection to a load-balancing element, to one of a plurality of available processing systems each connected to the load-balancing eilement by separate point-to-point connections, io comprising at the load-balancing element: extracting the message from the stream; detecting in the extracted message the presence of an identifier identifying one of the available processing systems; and where the presence of the identifier is detected, forwarding the message to the processing system identified thereby via the appropriate connection; otherwise determining a destination processing system for processing the message; inserting into the message an identifier identifying the determined destination processing system; and forwarding the message to the processing system via the appropriate connection.

14 Claims, 3 Drawing Sheets

U.S. PATENT DOCUMENTS

| | | |
|---|---|---|
| 6,990,101 B1 | 1/2006 | Chow et al. |
| 7,065,043 B2 * | 6/2006 | Wu et al. ............... 370/229 |
| 7,068,597 B1 * | 6/2006 | Fijolek et al. ........... 370/230 |
| 7,082,122 B2 * | 7/2006 | Pan ........................ 370/352 |
| 7,366,755 B1 * | 4/2008 | Cuomo et al. ........... 709/204 |
| 2002/0073203 A1 * | 6/2002 | Gilleland ................. 709/227 |
| 2002/0133611 A1 | 9/2002 | Gorsuch et al. ......... 709/231 |
| 2002/0174034 A1 * | 11/2002 | Au et al. .................. 705/27 |
| 2003/0023877 A1 * | 1/2003 | Luther et al. ............ 713/201 |
| 2003/0093462 A1 | 5/2003 | Koskelainen et al. |
| 2003/0108052 A1 * | 6/2003 | Inoue et al. .............. 370/399 |
| 2003/0110257 A1 * | 6/2003 | Hyun et al. .............. 709/224 |
| 2003/0210694 A1 * | 11/2003 | Jayaraman et al. ...... 370/392 |
| 2004/0088424 A1 * | 5/2004 | Park et al. ............... 709/229 |
| 2004/0152469 A1 | 8/2004 | Yla-Outinen et al. |
| 2004/0197079 A1 * | 10/2004 | Latvala et al. ........... 386/46 |

OTHER PUBLICATIONS

Non-Final Office Action dated Oct. 7, 2008 cited by examiner in U.S. Appl. No. 10/557,405, 9 pgs.

\* cited by examiner

METHOD AND APPARATUS FOR LOAD-BALANCING

The present invention relates to the field of distributed processing systems and, more particularly, to improvements in load-balancing systems and methods.

Increasingly network-based services and applications are accessed via some kind of load-balancing arrangement. For example, when a network-based service has a large number of concurrent users, load-balancing enables the processing load to be distributed among multiple backend servers or applications. Should the number of users increase over time, additional backend servers may be added to cope with the increased load, completely transparently to the user. A load-balancer may, for example, receive all requests to a network-based service, and forward the requests to an appropriate backend server based on the load or some other parameter of the system. One advantage of using load-balancers is that services may be provided with a single externally visible address.

Many types of network service, for example those using hypertext transfer protocol (HTTP) over the Internet, use a simple request and response mechanism. For example, an Internet browser sends a HTTP request to an application, and the application responds with a HTTP response. The application address is typically the address of a load-balancer which then routes the request to an available server based, for example, on the current workload of the available servers. In many such situations, all requests may be treated independently of all other requests—including successive requests coming from the same user. In such cases, there is typically no requirement that different requests from the same user be processed by the same backend server. In other words, the requests are effectively contextless and do not require the load-balancer to have any knowledge of any previous requests in order to determine to which backend server to forward the message.

In other situations, context information must be maintained by the load-balancer in order to determine to which backend server a message should be forwarded. For example, in telecommunication networks, multiple messages may be sent to and from a terminal to establish a call with another party. It is thus generally important that the same server processes different messages related to the same call. For example, when establishing a telephone call it is typically desirable that the same backend server processes all messages relating to the call establishment. This type of functionality is commonly referred to as server affinity.

In order to provide server affinity, a load-balancer is required to store some context information, for example the call ID of each message, and to check each received message to determine whether that call ID is already being processed by a given server, to thereby ensure that subsequent messages having the same call ID are processed by the same backend server. This is typically achieved by maintaining a database containing details of current calls IDs and backend servers processing messages relating to each call ID. Aspects of traditional telephony systems typically function in this way.

In traditional telephony applications server affinity may only be required during the establishment of a call, which typically only lasts for a few seconds. Thus, once a call has been established, the load-balancer can remove all references to that call ID, freeing up space in the database.

However many other systems, including some of the new telephony protocols, such as the session initiation protocol (SIP), function in sufficiently different ways that the conventional load-balancing approach is no longer suitably adapted.

SIP, for example, is an application-layer control or signaling protocol for establishing, modifying, and terminating real-time calls and conferences over, primarily, Internet protocol (IP) networks. At its simplest, a call setup in SIP requires two transactions: one to setup a call; and one to release the call. A SIP transaction typically only lasts a few seconds, whereas a SIP call is theoretically unbounded. Due to the nature of SIP, where, for example, call legs may be added to a current call, media types may be changed at any time, and so on, it is generally required that SIP messages belonging to the same call be processed by the same backend server.

Traditional load-balancing approaches, such as maintaining a database of context information for all active calls at a load-balancer, may therefore, not be suitably adapted for use with SIP for a number of reasons. Firstly, since the length of a SIP call is theoretically unbounded and the fact that the load-balancer must typically store call context information for the duration of each and every the call, it is possible that the load-balancer may become overwhelmed, especially if the number of simultaneous calls and the number of backend servers is large. These constraints may impact the performance capabilities of such a load-balancer and limit the message handling capabilities thereof.

Accordingly, one aim of the present invention is to provide a system which overcomes at least some of the above-mentioned problems.

According to a first aspect, there is provided a method of routing a message, conveyed in stream through a point-to-point connection to a load-balancing element, to one of a plurality of available processing systems. Each of the available processing systems being connected to the load-balancing element by separate point-to-point connections, and comprising at the load-balancing element: extracting the message from the stream, detecting in the extracted message the presence of an identifier identifying one of the available processing systems, and where the presence of the identifier is detected, forwarding the message to the processing system identified thereby via the appropriate connection, otherwise determining a destination processing system for processing the message, inserting into the message an identifier identifying the determined destination processing system, and forwarding the message to the processing system via the appropriate connection.

Advantageously, this removes the need for a load-balancing element to maintain a context database of all current calls being processed, thus reducing the processing load of the load-balancer.

Where the message includes a message identifier for identifying related messages, the method further comprises maintaining a database of message identifiers for which no destination identifier was detected along with information indicating to which of the available processing systems each message was forwarded to.

Suitably, where a message is received without a destination identifier, the database is searched for a related message identifier and, where found, the message is forwarded to the processing system identified therein.

Preferably entries in the database after removed a predetermined amount of time.

Preferably the point-to-point connection is a transport control protocol (TCP) connection, and the message is a session initiation protocol (SIP) message.

The step of inserting preferably comprises inserting the destination identifier into an extension header of a SIP message.

According to a second aspect, there is provided a load-balancing element for routing a message conveyed in a stream through a point-to-point connection to one of a plurality of available processing systems each connected to the load-balancing element by separate point-to-point connections. The load-balancing element preferably comprises: a message processor for extracting the message from the stream, a message analyzer for detecting in the received message the presence of an identifier identifying one of the available processing systems, and a message forwarder for forwarding the message to the processing system identified thereby via the appropriate connection.

The load-balancing element further comprises, for when the presence of a destination identifier is not detected, a load analyzer for determining a destination processing system for processing the message, and a message processor for inserting into the message a destination identifier identifying the determined destination processing system.

Each message preferably includes a message identifier for identifying related messages, and the load-balancing element further comprises a database for storing details of message identifiers for which no destination identifier was detected along with information indicating to which of the available processing systems each message was forwarded to.

For where a message is received without a destination identifier, the load-balancing element further includes means for searching the database for a related message identifier and for identifying to which processing system the message should be forwarded.

Preferably the load-balancing element is adapted for use where each point-to-point connection is a transport control protocol (TCP) connection, and wherein the message is a session initiation protocol (SIP) message.

Suitably the message processor is adapted for inserting the destination identifier into an extension header of a SIP message.

According to a yet further aspect, there is provided a session initiation protocol (SIP) network comprising elements according to any of the previously mentioned elements.

According to a still further aspect, there is provided a session initiation protocol (SIP) network operating in accordance with any of the above-mentioned steps.

An embodiment of the invention will now be described, by way of non-limiting example, with reference to the accompanying diagrams, in which.

Figure 1:
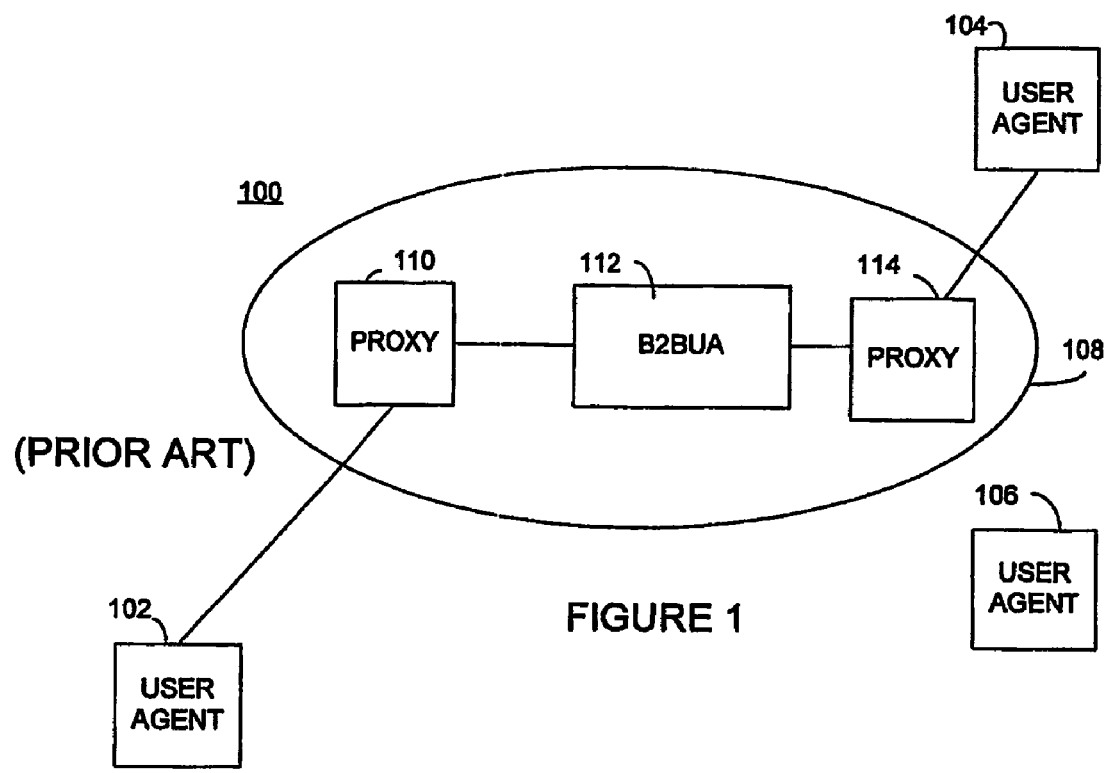
FIG. 1 is a block diagram showing an overview of a simple SIP network arrangement according to the prior art.

FIG. 1 is a block diagram showing an overview of a simple SIP network arrangement 100 according to the prior art. A number of terminals, which may be SIP user agents (SUA), 102, 104 and 106 are shown. The user agents may establish calls between one another, and may also access value added services, such as pre-paid billing, conferencing and the like, provided by, for example, a back-to-back user agent (B2BUA) 112.

SIP messages include a number of different fields, including:
a To: field, identifying the universal resource identifier (URI) of the intended destination;
a From: field, identifying the URI of the source;
one or more Via: fields, indicating Intermediate hops taken or to be taken to arrive at the destination
a Call-ID field, which is a globally unique identifier for the call For example, if a user agent 102 wishes to make a pre-paid call to user agent 104, a SIP INVITE message is sent to the SIP proxy server 110, with the Via: field identifying the URI of the proxy 110, the From: field identifying the URI of the user agent 102, and the To: field identifying the URI of the user agent 104. The SIP proxy 110 recognizes the address of user agent 102 as being a pre-paid customer, and forwards the message to the B2BUA 112 which performs the necessary account authentication and credit checks before connecting the call, via the SIP proxy 114 to the user agent 104.

Figure 2:
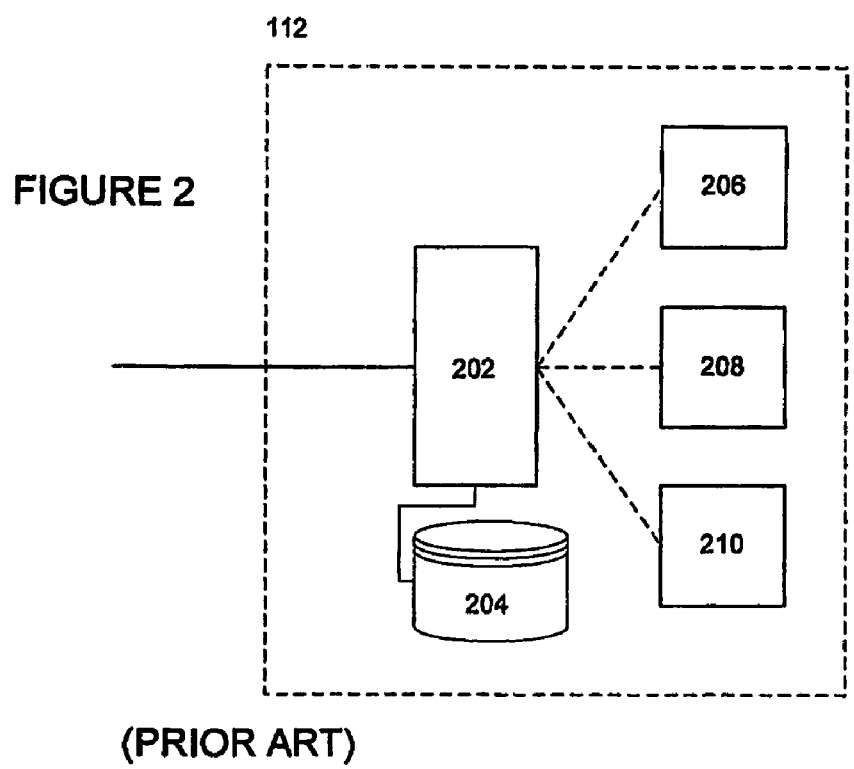
FIG. 2 is a block diagram showing a back-to-back user agent (B2BUA) according to the prior art.

Typically the value added services mentioned above may be configured in a distributed processing arrangement, as shown in FIG. 2 which shows a B2BUA 112 in accordance with the prior art.

A load-balancer 202 is provided which receives all incoming messages sent to the B2BUA 112. As mentioned above, one of the advantages of using a load-balancer is that the network sees only a single external network address. The load-balancer 202 forwards each received message to one of a plurality of backend servers 206, 208, 210 which carry out the required processing operations. Such processing operations could include, for example, pre-paid billing, credit card authorizations, portal authentication and so on. The load-balancer 202 may determine which backend server to use through use of any appropriate algorithm, such as least loaded, round robin and so on. It will be appreciated that although the load-balancer and back-end servers are shown as being integral to the B2BUA 112, these elements may be located externally therefrom, for example in a distributed manner.

Since it is generally advantageous that all SIP messages relating to the same call are processed by the same backend server, the load-balancer 202 maintains a context database 204 of all current SIP calls along with related call IDs and the identity of the backend server which is processing the call. Additionally, messages sent from a backend server 206, 208 or 210 to a user agent, also pass through the load-balancer 202 so that the load-balancer can determine when a SIP call has terminated thereby allowing the load-balancer to clean up the database 204. As previously mentioned, due to the theoretically endless nature of a SIP call coupled with the large number of simultaneous calls which can be handled by the B2BUA 112, the database 204 has to be sufficiently large to handle data from the maximum number of simultaneous calls which the B2BUA 112 can support.

An embodiment of a load-balancing mechanism and system will now be described with reference to FIGS. 3 to 5.

Figure 3:
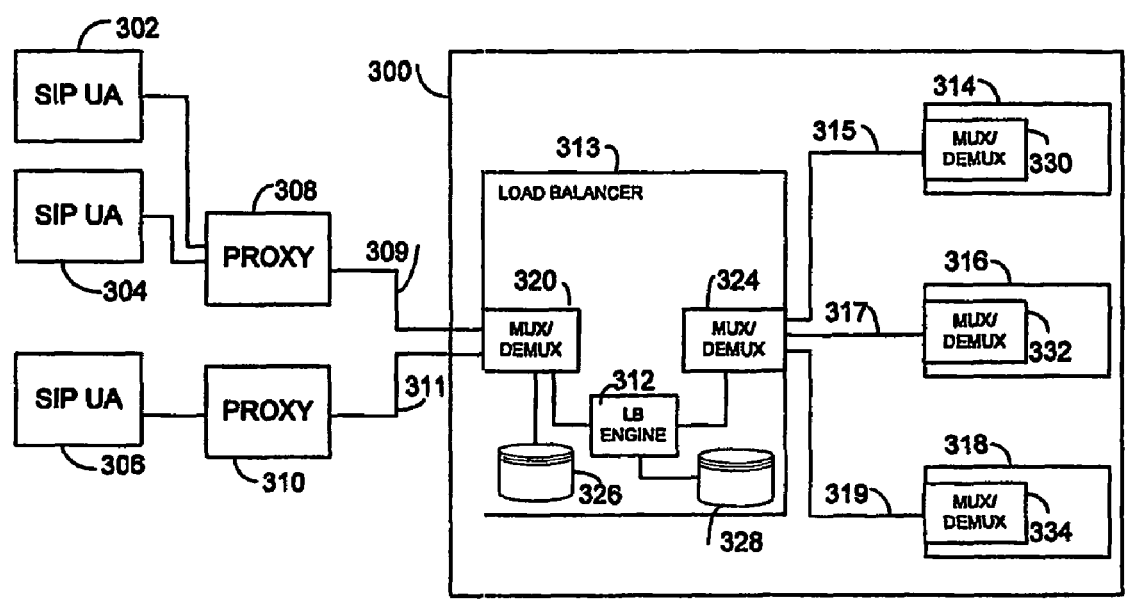
FIG. 3 is a block diagram showing a SIP network incorporating a load-balancing system according to an embodiment of the present invention.
Figure 4:
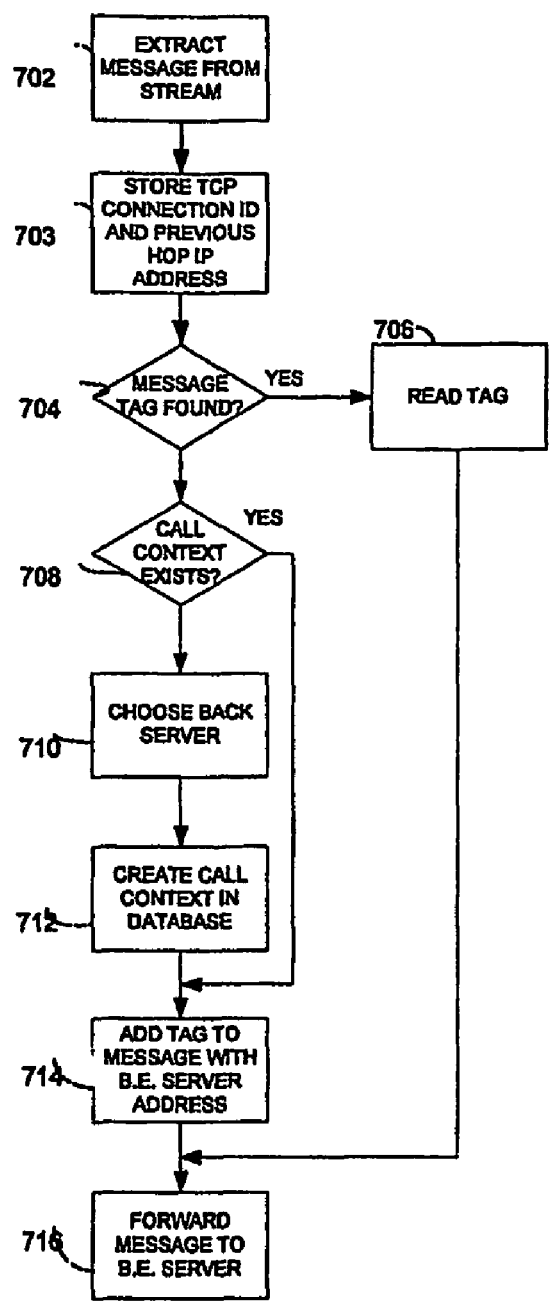
FIG. 4 is a flow diagram outlining example processing steps of a load-balancer operating in accordance with an embodiment of the present invention.

FIG. 3 is a block diagram showing an overview of a SIP network arrangement incorporating a load-balancing system according to one embodiment of the present invention.

A number of SIP user agents 302, 304 and 306 are shown. The SIP user agents are arranged to make, for example, pre-paid calls to other SIP user agents (not shown). SIP user agents 302 and 304 are configured to use a SIP proxy 308 and SIP user agent 306 is configured to use a SIP proxy 310. When any of the SIP user agents wishes to make a call, a SIP invite message is initially sent to the appropriate SIP proxy 308 or 310. The Via: field of the SIP message identifies the URI of the relevant proxy, the From: field Identifies the URI of the originating SIP user agent and the To: field Identifies the URI of the called party.

Each of the SIP proxies 308 and 310 may recognize the address of the originating SIP user agent, for example SIP user agent 302, as being a pre-paid customer. If the originating SUA is recognized as a pre-paid customer, the SIP invite message is forwarded to a B2BUA 300 which performs, for example, the necessary account authentication, credit checks etc. before connecting the call in the normal manner. The B2BUA 300 is arranged in a distributed manner with all requests to the B2BUA being handled by a load-balancer 313, which distributes processing tasks to a number of backend processors 314, 316 and 318. Although shown as being part of the B2BUA 300, it will be appreciated that one or more elements such as the backend servers, of the B2BUA could be geographically remote therefrom.

Each of the proxies 308 and 310 are connected to the B2BUA 300 via individual maintained TCP connections 309 and 311 respectively. The SUAs 302, 304 and 306, may communicate with their respective proxies using either TCP or user datagram protocol (UDP). Messages received by each of the SIP proxies 308 and 310 intended for the B2BUA 300 are Inserted, or multiplexed, into their respective TCP streams. For example a SIP message originating from SIP user agent 302 is multiplexed in the TCP stream 309 by SIP proxy 308. If no TCP connection with the B2BUA exists, for example if no messages received by the proxy have had the destination URI of the B2BUA within a predefined period, a new TCP connection is established. Similarly, a SIP proxy may close a TCP connection with the B2BUA 300 if no traffic is detected in the connection for a predefined period.

The TCP connections 309 and 311, being point-to-point connections, are terminated at a load-balancing element 313 of the B2BUA 300. A multiplexer/demultiplexer (mux/demux) 320 extracts incoming SIP messages from the various incoming TCP streams and passes them to a load-balancing engine 312. The mux/demux 320 maintains a lookup table, database or the like, 326, storing the IP address of the previous hop of the message (e.g. SIP proxy 308 or 310) along with an identifier of the TCP connections on which the SIP message was received. This is to enable response messages to be correctly routed back to the message originator, as is explained further below.

The load-balancing engine 312 receives each incoming SIP message and performs a load-balancing algorithm as described below with reference to FIGS. 4 and 5. In particular, FIG. 4 is a flow diagram outlining example processing steps which may made by the load-balancing engine 312 of FIG. 3. In the following description, for simplicity of explanation, some of the steps shown in FIG. 4 are initially not discussed.

When a message relating to a new call, such as a SIP invite message, arrives at the load-balancing engine 312, the load-balancer selects (step 710) one of the available backend servers 314, 316 or 318 to process the message using a suitable algorithm, such as round-robin, least loaded or the like as will be appreciated by those skilled in the art. The load-balancing engine 312 inserts a tag in the SIP message (step 714) indicating the identity of the chosen backend server and forwards the message to the chosen backend server (step 716). Since each of the backend servers 314, 316 and 318 are Individually connected to the load-balancer 313 by respective TCP connections 315, 317 and 319, a mux/demux 324 is used to multiplex the message into the appropriate TCP stream connected to the chosen backend server. It will be understood, however, that the mux/demux may be any kind of suitable message or data processing system allowing the extraction or insertion of a message or data into an existing stream.

Preferably the inserted tag contains sufficient information to enable the load-balancing engine 312 to route the message to a backend server without requiring a further call context. In other words, the identity of the backend server selected to process the message is contained within the message itself. Additionally, the tag is preferably inserted into the SIP message such that the tag will be included in all future messages sent in response to the message. For example, in SIP the message may be suitably inserted as an extension header.

SIP provides for the re-transmission of messages in the event that a response is not received within a predetermined amount of time. One problem that this can create is that if a backend server is slow to respond, or if an initial message is lost, for example, a SIP user agent may retransmit the same message. If this message happens to be the first message related to a call (i.e. there is no tag present), the load-balancer is likely to send this message to a different backend server than that dealing with the first message. This may lead to the system creating several call contexts in different backend servers for a single SIP call which may result in protocol violations, for example if identical responses are sent to a user agent client, or sub-optimal processing.

To overcome this, the load-balancing engine 312 preferably maintains a database 328 of all messages which relate to new calls. Thus, the following additional steps are performed. For example, when a message is received it is determined (Step 704) whether a previously inserted tag is present. If not, this indicates that the received message may relate to a new call. The new call database 328 is then searched to determine whether a message with the same call identification is present in the database (step 708). If yes, then the message may be, for example, a retransmitted message or a CANCEL message sent shortly after an initial INVITE message, and is forwarded (step 716) to the backend server indicated in the database once a suitable tag has been inserted in the message (step 714). If no message having the same call ID is found, this indicates that this is the first message relating to a call, in which case a suitable backend server is chosen to process the message (step 710). A call context is subsequently created in the new call database 328 (step 712), a tag is added to the received message identifying the chosen backend server (step 714), and the message is forwarded to the chosen backend server (step 716) in the manner described above.

After a predetermined amount of time from their creation in the database entries in the databases may be deleted since after this time no further untagged messages relating to the same transaction may be accepted by the load-balancer. The SIP timeout period is defined as 32 seconds, so for SIP the entries in the database may be removed after this time.

Each of the backend servers 314, 316, and 318 include respective mux/demuxes 330, 332 and 334, for extracting SIP messages sent from the load-balancer 313. Extracted SIP messages are processed as appropriate.

The SIP specification specifies that, for TCP, response messages sent from backend servers to the user agents must be made via the same path. This then prevents a backend server communicating directly with a user agent using a new TCP connection. In order for this requirement to be met, response messages from each backend server should be sent back to the load-balancer 313 for retransmission to the appropriate user agent via the original path.

When a backend server generates a response to a SIP message the SIP message is sent in a TCP stream. The To: field of the SIP message is, as usual, set as the final destination of the response message, e.g. the SIP user agent 302, however the TCP stream terminates at the load-balancer 313, since the, as previously mentioned, the backend server may not respond directly to the SUA. The load-balancer 313 then has to determine where to forward the received message.

Figure 5:
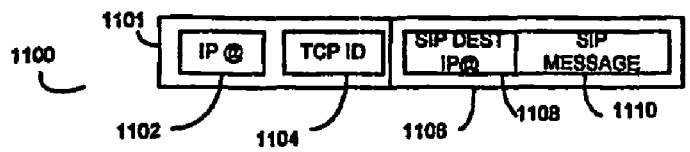
FIG. 5 is a block diagram showing an example response message.

To achieve this, the backend server encapsulates the SIP response message in a proprietary message 1106, as shown in FIG. 5. FIG. 5 shows a response message 1100 generated by a backend server in response to a previously received SIP message. The message 1100 includes a usual TCP header 1101 which includes an IP address 1102 (e.g. the IP address of the load-balancer 313), and a TCP identifier identifying the TCP connection connecting the backend server with the load-balancer. This is particularly necessary where the backend server maintains multiple TCP connections, for example, with other B2BUAs. The proprietary message 1106 includes the resolved IP address 1108 of the next hop (i.e. of the SIP proxy 308) of the SIP response message 1110. The IP address 1108 of the proprietary message 1106 is preferably the fully resolved IP address, obtained by performing a DNS resolution, of the URI of the previous hop obtained from the Via: field of the SIP response message 1110.

The load-balancer 313 receives the message 1100 through the mux/demux 324 which extracts the message 1110 from the incoming TCP stream. The load-balancer engine 312 extracts the resolved address 1108 and the SIP message 1110 from the proprietary message 1106 and determines, based on the IP address 1106, through which of the open TCP connections 309 and 311 the SIP response message 1110 should be sent. Preferably this is achieved by performing a search or lookup in the previously mentioned lookup table 326.

Finally, the SIP response message 1110 is multiplexed into the stream of the determined TCP connection by mux/demux 320, and the message is sent to the appropriate SIP proxy, in this case SIP proxy 308.

It should be noted, however, that although the To: field of the SIP response message 1110 is the SIP URI of the SIP user agent 302, the response message is sent via the TCP connection 309 to the SIP proxy 308. This is because SIP address resolution is performed on a hop-by-hop basis. The SIP proxy 308 extracts the incoming messages from the stream 309 and forwards them, based on the URI in the To: field of the SIP message to the appropriate destinations.

As will be appreciated by those skilled in the art, SIP requires that messages within the same transaction use the same path. However, subsequent transactions within the same call may use a direct path between the SIP user agent 302 and the SIP service application 300, by-passing the SIP proxy 308. For example, a SIP call may be established between a SIP user agent 302 and the B2BUA hosting, for example, a conferencing service. Once the call is connected, the SIP user agent 302 may be used for sending instant messages to the conference server or another callee using a direct path.

As described previously, a predetermined amount of time after the details of the first SIP message are stored in the database all entries having the corresponding call identification may be erased. In this way, the database 328 only contains context information for a given call identification for a maximum of 32 seconds.

In such a system as described above the resource requirements of a load-balancer are no longer proportional to the number of established calls, since only the context information of newly established calls is required to be maintained by the load-balancer.

As will be appreciated by those skilled in the art, the herein-described functionality performed by the load-balancing engine 312 may be provided in a number of ways, for example, by way of software, by suitable electronic hardware, or a combination of both software and hardware. For example, the load-balancing engine 312 may comprise suitable logical or functional elements such as a message analyzer, for analyzing the messages to determine whether an inserted tag is present, a load analyzer, for determining by which back-end server a message should be processed, a message processor, for inserting identification tags into a message, and a message forwarder for forwarding a message to an appropriate backend server. Such elements may be provided in various combinations.

In the embodiments described herein, no modifications are required to the SIP user agents since the effect of inserting the tag is effectively transparent. Furthermore, in the event of a failure of a backend server, the load-balancer 313 can forward the message to a backup server other than that indicated by the inserted tag, without the SIP user agent ever being aware that a failure occurred.

The invention claimed is

1. A method of routing a message to a load-balancing element, comprising at the load-balancing element: extracting from a stream a message conveyed in the stream through a point-to-point connection to a load balancing element; detecting in the extracted message the presence of a destination identifier identifying one of a plurality of available processing systems each connected to the load-balancing element by separate point-to-point connections; and where the presence of the destination identifier is detected, forwarding the message to the processing system identified thereby via the appropriate connection; otherwise detecting in the extracted message a message identifier for identifying related messages; searching a database of message identifiers for which no destination identifiers were detected, the database having information indicating to which one of the available processing systems each such message having no destination identifier was forwarded; determining a destination processing system for processing the message; inserting into the message an identifier identifying the determined destination processing system; and forwarding the message to the processing system via the appropriate connection.

2. A method according to claim 1, the method further comprising maintaining the database of message identifiers for which no destination identifiers were detected along with the information indicating to which of the available processing systems such messages having no destination identifier were forwarded.

3. A method according to claim 2, wherein determining a destination processing system for processing the message, if the presence of a destination identifier is not detected, comprises determining the destination processing system to be the available processing system to which a related message was sent if the detected message identifier is found in the database, and determining the destination processing system by a load analyzer if the detected message identifier is not found in the database.

4. A method according to claim 1, further comprising removing entries in the database after a predetermined amount of time.

5. A method according to claim 1, wherein the point-to-point connection is a transport control protocol (TCP) connection, and wherein the message is a session initiation protocol (SIP) message.

6. A method according to claim 1, wherein the step of inserting further comprises inserting the destination identifier into an extension header of a SIP message.

7. A session initiation protocol (SIP) network operating in accordance with the method of claim 1.

8. A load-balancing element, comprising: a message processor for extracting from a stream a message conveyed in the stream through a point-to-point connection to the load-balancing element; a message analyzer for detecting in the received message the presence of a destination identifier identifying one of a plurality of available processing systems each connected to the load-balancing element by separate point-to-point connections and the presence of a message identifier for identifying related messages; a database for storing details of message identifiers for which no destination identifier was detected along with information indicating to which of the available processing systems each such message having no destination identifier was forwarded; and a message forwarder for forwarding the message, via the appropriate connection, to the processing system identified by the destination identifier if the presence of a destination identifier is detected, and to a processing system to which a related message was forwarded if the presence of a destination identifier is not detected and the message identifier is contained in the database.

9. A load-balancing element according to claim 8, further comprising, for when the presence of a destination identifier is not detected, a message processor for inserting into the message a destination identifier identifying the processing system to which the message is to be forwarded for processing.

10. A load-balancing element according to claim 9, further comprising, for when the presence of a destination identifier is not detected and the message identifier is not contained in the database, a load analyzer for determining a destination processing system to which the message forwarder should forward the message for processing.

11. A load-balancing element according to claim 8, further comprising, where a message is received without a destination identifier, means for searching the database for a related message identifier and for identifying to which processing system the message should be forwarded.

12. A load-balancing element according to claim 8, adapted for use where each point-to-point connection is a transport control protocol (TCP) connection, and wherein the message is a session initiation protocol (SIP) message.

13. A load-balancing element according to claim 8, wherein the message processor is adapted for inserting the destination identifier into an extension header of a SIP message.

14. A session initiation protocol (SIP) network comprising elements according to claim 8.

* * * * *